Oct. 19, 1926.

O. M. TUCKER ET AL 1,604,000

METHOD AND APPARATUS FOR DELIVERING VISCOUS GLASS

Original Filed August 12, 1918

Oliver M. Tucker
William H. Reeves
INVENTORS

BY

Edwin P. Forbes ATTORNEY

Patented Oct. 19, 1926.

1,604,000

UNITED STATES PATENT OFFICE.

OLIVER M. TUCKER AND WILLIAM A. REEVES, OF COLUMBUS, OHIO, ASSIGNORS, BY MESNE ASSIGNMENTS, TO HARTFORD-EMPIRE COMPANY, OF HARTFORD, CONNECTICUT, A CORPORATION OF DELAWARE.

METHOD AND APPARATUS FOR DELIVERING VISCOUS GLASS.

Original application filed August 12, 1918, Serial No. 249,421. Divided and this application filed September 29, 1924. Serial No. 740,479.

Our invention relates to a method and apparatus for delivering viscous glass. It has particular reference to such a spout in connection with a glass furnace, being primarily designed to meet certain requirements in the production of en bloc charges preformed as to shape and dimensions and the dropping and settling of such charges right side up in the molds where they are to be further treated.

Others have devised spouts which deliver viscous glass from furnace to mold and others have provided means for heating the glass in such spouts. But, the production of preformed charges and the proper deposit thereof calls for certain accuracies that are only attainable by special measures of control. For instance, glass being delivered through a spout frequently develops strata of different temperatures and, if this condition persists in the glass being actually delivered from the delivery orifice of the spout, the charges will frequently curve, because one side is colder than the other or will be otherwise of uneven consistency. Then, the curved charges will not properly settle in their molds while the uneven consistency will prevent proper subsequent treatment, as by blowing thin, et cetera. These are merely examples of numerous defects due to improper temperature control. Our invention contemplates providing a spout structure which is thoroughly insulated and then equipping such spout with means whereby the temperature of both the spout interior and the glass may be efficiently regulated.

Thus, regardless of variations in furnace conditions, we have devised a novel apparatus for further regulating the temperature of the glass in the spout orifice just prior to being discharged and thereby effecting the delivery of mold charges of viscous glass of chosen quantity, quality and uniformity. In this way, we have taken the handling of glass one step further away from formerly existing limitations inherent in the problem of extracting viscous glass from furnaces whose internal conditions are inevitably ever-changing.

This application is a division of our co-pending application, filed August 12, 1918, Serial No. 249,421, a method and apparatus for delivering viscous glass.

The preferred embodiment of our invention is shown in the accompanying drawings wherein.

Figure 1:
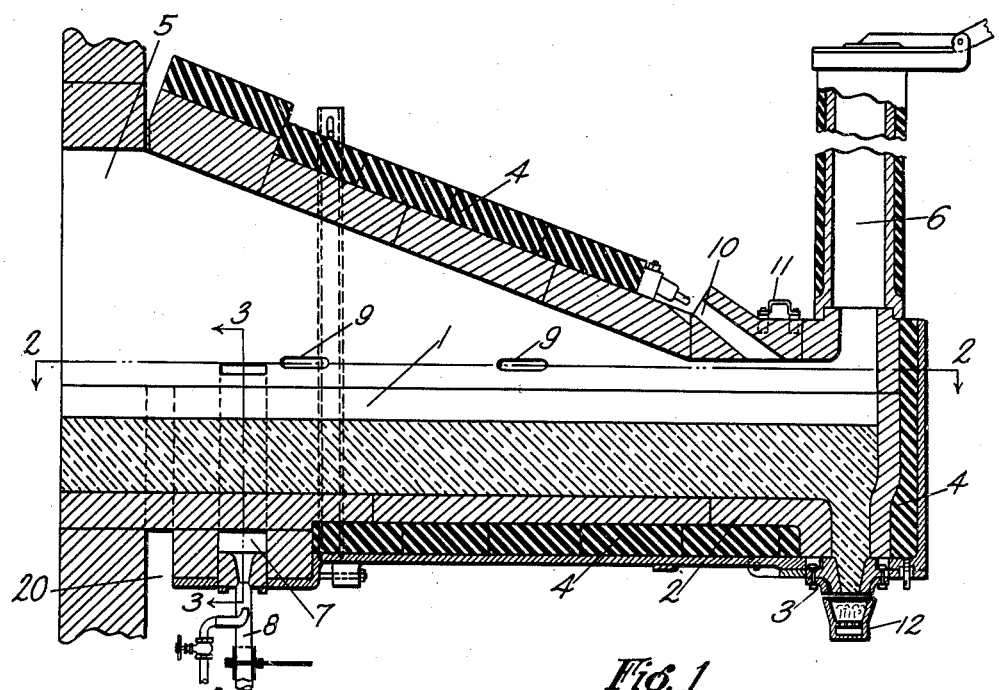
Figure 1 is a longitudinal section of our spout structure, shown applied to a furnace.
Figure 2:
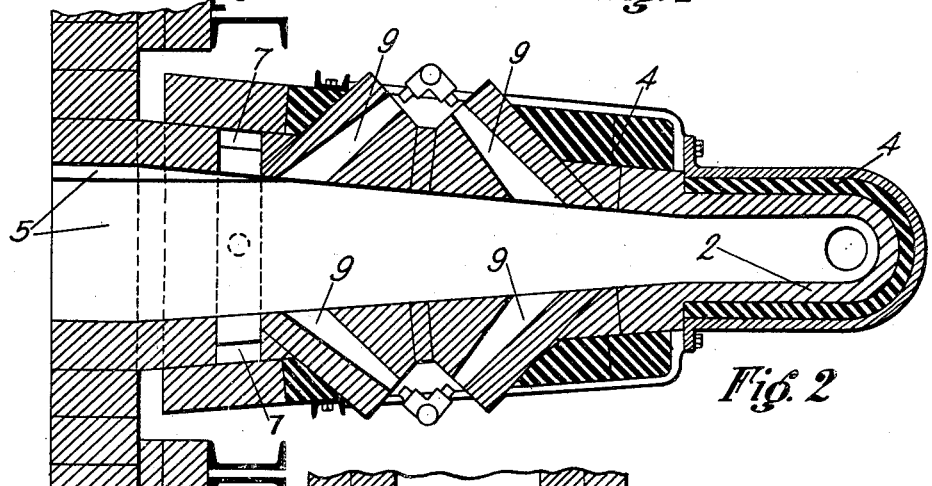
Figure 2 is a section taken on line 2—2 of Figure 1.
Figure 3:
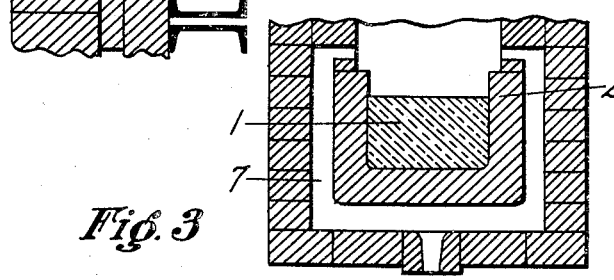
Figure 3 is a partial section, taken on the line 3—3 of Figure 1.

Referring to Figs. 1 and 2 of the drawing, there is shown an illustrated embodiment of our invention, in which the numeral 1 indicates a spout construction having a refractory lining 2 and a discharge orifice 3 located in the forward bottom portion thereof. The top, bottom, sides and ends of the spout are thoroughly insulated as at 4.

We have provided several means, additional to the insulation, for controlling the internal temperature of the spout and the temperature of the glass at different points in such spout. In the first place, both the channel and the hood of the spout are enlarged at their receiving end, as at 5. This facilitates inlet of the glass and the heat currents from the glass furnace. More important, still, the wide channel for the glass results in slow movement of the glass at this point and we utilize this condition for temperature regulation before the glass passes into the heavily insulated narrow channel. Thus, before the glass reaches the delivery orifice where it has a more rapid movement, it has ample time for any heated and chilled strata appearing in the glass to diffuse and thus permit the delivery of charges of any desired uniform temperature and consistency. From its wide portion, the spout tapers toward its delivery end where it is provided with a valve-controlled draft flue or chimney 6 which is also lined with refractory and insulating material. This flue is located in the top portion and at the extreme end of the spout nose to assist in drawing the heat currents from the furnace through the spout, above and in direct contact with the glass in the spout. Thus by maintaining the glass at a more uniform temperature and consistency it passes through the spout with a minimum amount of wall-friction and the flow is more readily controlled.

The walls of the spout are provided with a channel which is shown at 7 as extending around three sides of the spout adjacent the juncture of the spout with the furnace and which may be fed with a heating or cooling fluid from below as at 8. In the form shown these channels deliver into the space 5 (Fig. 1) and the heating or cooling fluid, preferably a gas may be so delivered as to commingle with the heat currents from the furnace so as to directly modify the effect of such currents upon the glass and wall surfaces and, in time, to modify the effect of the wall surfaces upon the glass. It will be obvious that the channel 7 may be ramified to various points in the walls of the spout. However, it is an important fact of our invention that we positively influence the temperature of the glass very near the moment when it enters the spout, and by providing a relatively long narrow tapering spout, ample opportunity is afforded for diffusion of the impressed temperature during the time the glass travels to the delivery orifice. An air seal space 20 is provided in the furnace walls at the juncture of the spout walls with those of the furnace.

The walls of the spout are also provided with ports 9 which are arranged obliquely therein and located so as to direct heating or cooling blasts in opposite directions to the area above the upper surface of the glass in the spout. Furthermore, our invention contemplates the provision of a port 10 located in a removable cover block 11, which encloses a part of the top of the spout nose. This port is located in the block so as to direct heating or cooling medium within the nose and in direct contact with the glass adjacent to the delivery orifice. This cover block, which may be properly designated a burner block, is movably mounted so that it may be readily replaced when damaged, and also to provide a ready means to permit inspection of the interior of the spout.

In the operation of apparatus embodying our invention, molten glass having received its initial heat in the furnace is conducted through the body portion of the spout 1 toward the delivery orifice 3 and upon its entry into the spout, the temperature of the glass is partially controlled by the application of a heating or cooling medium distributed by means of the conduit 7 located in the bottom and side walls of the spout. The temperature of the glass may then be further controlled by suitable burners directing a heating flame to the interior of the spout by means of the ports 9 located in the side walls of the spout. The application of these temperature controlling agencies maintains the relatively large volume of flowing glass at a substantially uniform temperature, but as the volume of glass in the forward portion of the spout is comparatively small, it is more susceptible to temperature changes and it is necessary to maintain a more accurate temperature control of the glass at this portion of the spout to prevent the glass from "channeling" or developing strata of different consistencies.

The desired temperature of the glass at the outlet is maintained by locating the burner port 10 and its associated burner in the top portion of the spout, so that it is adapted to direct a heating medium forwardly and downwardly on the glass adjacent to the outlet. The arrangement is such that the flames from the burner port 10 are projected downwardly, directly on the glass, and further control of this heating flame is obtained by the draft damper located in the flue. The flue is preferably placed near the burner so that when the burner is delivering a suitable flame, slight changes of temperature in the glass may be compensated for by regulating the damper to regulate the draft and thus control the effect of the flame on the glass. By thus providing the above-described novel heating and associated draft ventilating structure at the discharge portion of the spout, we are enabled to control the temperature of the glass discharged from the spout orifice with a greater accuracy than has been accomplished by heating apparatus heretofore employed.

Thus, the temperature of the glass and spout walls at every point is under positive control and this control is so complete that the glass may be brought to the delivery orifice at any desired uniform consistency and at any rate of movement within chosen limits.

In addition, we have a means for intermittently stopping feed of the glass from the delivery orifice of the spout, which means takes the form of a cup 12 movable into and out of closing relation to the bottom end of the spout orifice. When in position, gas under pressure is fed to the cup and burned therein while the cup is closed with the exception of an extremely small outlet for the products of combustion, so that an intense heat is applied to the clay bushing 3.

From this it will be seen that the glass in the spout is subject to complete temperature control, from the moment it enters until it leaves the spout. In our method, these temperature controls are desirably utilized to insure a uniform temperature and rate of movement at the delivery orifice. A large part of the uniformity of temperature and rate of movement is attributable to the insulation upon the spout, for it greatly enhances surety of control, although the various features of control are all important.

It has been pointed out above, and it is particularly noted as characterizing our invention, that the temperature of the glass at the discharge outlet of the spout is controlled by the novel arrangement and location of the heating and ventilating apparatus employed. The appended claims are to be understood as embodying these characteristics. It will be understood that our invention is not restricted to the use of the particular apparatus details disclosed herein, and that no limitations are to be imposed upon our invention, except such as are indicated in the appended claims.

Having thus described our invention, what we claim is:

1. A spout for delivering viscous glass from a furnace comprising a body portion with a delivery aperture therein, and a removable cover block closing the top of the spout adjacent the delivery aperture, said block having a port therein which is adapted to direct temperature modifying fluid forwardly and downwardly into said spout and to the glass adjacent to said delivery aperture.

2. A spout for delivering viscous glass from a furnace comprising a body portion with a delivery aperture therein, a removable cover block closing the top of the spout adjacent to the delivery aperture, said block having a port located therein, and means associated with the port for directing a flame forwardly and downwardly into the spout.

3. A spout for delivering viscous glass from a furnace comprising a channel portion with a delivery outlet in the forward bottom portion thereof, a removable burner block closing the top of the spout and having a port displaced to one side of the delivery outlet, means for directing a heating flame through said port downwardly and forwardly upon the surface of the glass at the outlet, and a chimney in the top wall adjacent to the burner block for removing products of combustion upwardly from the surface of the glass.

4. A spout for delivering viscous glass from a furnace comprising a body portion with a delivery aperture therein, a removable burner block adjacent the delivery opening and arranged to form a cover section for the spout, means for supplying a temperature-modifying fluid, said block having a port located so as to direct the temperature-modifying fluid forwardly and downwardly into the nose of the spout and above the glass level, a chimney located adjacent to the cover section, and means associated with the chimney for controlling the draft in the spout, whereby the temperature effect of the fluid on the glass may be regulated.

5. A spout for delivering viscous glass from a furnace comprising a glass channel portion with a delivery aperture therein, a removable burner block located near the forward end of the spout and forming a cover section therefor, means for supplying a temperature-modifying fluid, said block having a port located so as to direct the temperature-modifying fluid forwardly and downwardly on the glass adjacent to the outlet, a chimney located adjacent to the cover section, and a damper associated with the chimney for controlling the draft in the spout whereby the temperature effect of the fluid on the glass may be regulated.

6. A spout for delivering viscous glass from a furnace comprising a glass channel with a delivery aperture therein, and having a removable burner block section closing the top portion of the spout intermediate its length, means associated with the block for directing the temperature modifying medium forwardly and downwardly to the glass in the spout, and means located adjacent to the burner block for permitting the medium to be withdrawn upward from the spout to regulate the temperature of the glass at the outlet.

7. In a spout for delivering viscous glass from a furnace comprising a body portion, a valve-controlled chimney at the forward end of said spout, a port located adjacent to the chimney and adapted to direct a temperature-modifying medium downwardly and forwardly into the spout, and means associated with the chimney for regulating the flow of the temperature medium from the spout.

8. A spout for delivering viscous glass from a furnace comprising a glass channel portion having a submerged outlet at the forward end thereof, means for directing a temperature-modifying fluid into the spout at a point intermediate the length thereof and forwardly and downwardly of the spout, and a valve-controlled chimney at the forward end of the spout to regulate the flow of temperature-modifying fluid by removing the said fluid from the surface of the glass at the outlet.

9. A spout for delivering viscous glass from a furnace comprising a body portion with a bottom wall, side walls and a top wall, a removable cover block forming a portion of the top wall, said block having a port located therein and adapted to direct a supply of temperature-modifying fluid downwardly and forwardly into the spout at a point intermediate the length of said spout, a chimney located at the forward end of the spout and communicating therewith, and a damper located in the chimney for regulating the temperature effect of the modifying fluid independently of the supply.

10. A spout for delivering viscous glass from a furnace comprising a relatively long narrow body portion having a bottom wall, side walls, and a top wall, a discharge outlet in the bottom wall, a removable burner block forming a part of the top wall and having a port for introducing a temperature-modifying fluid into the spout at a point intermediate the length of said spout, said port being directed forwardly and downwardly toward the end of the spout, and a valve controlled chimney on said spout for regularly drawing said temperature-modifying fluid upward from the glass at the outlet.

11. A spout for delivering viscous glass from a furnace comprising a body portion with a delivery aperture therein, a removable cover block closing the top of the spout adjacent the delivery aperture, said block having a port therein which is adapted to direct temperature-modifying fluid forwardly and downwardly into said spout and to the glass adjacent to said delivery aperture, and means also located at the forward end of the spout for directing the fluid upwardly from the glass at the outlet.

12. A spout for delivering viscous glass from a furnace comprising a body portion with a delivery aperture therein, a removable cover block closing the top of the spout adjacent to the delivery aperture, said block having a port located therein, means associated with the port for directing a flame forwardly and downwardly into the spout, and a draft regulator located in the top wall of the spout for directing the flame upwardly from the glass for regulating the temperature effect of the flame on the glass.

13. The method of controlling the temperature of molten glass in a spout having a discharge outlet which comprises the steps of flowing the glass through the spout, and directing a temperature-controlling medium downwardly and forwardly on the glass adjacent to the outlet and thence upwardly from the glass.

14. The method of controlling the temperature of molten glass in a spout having a discharge outlet which comprises the steps of flowing the glass through the spout, supplying heat to the glass during its passage through the spout, and directing a temperature-controlling medium downwardly and forwardly on the glass adjacent to the outlet and thence upwardly from the glass.

15. The method of controlling the temperature of molten glass in a spout having a discharge outlet which comprises the steps of flowing the glass through the spout, supplying heat to the glass during its passage through the spout, and directing a heating flame downwardly and forwardly to the surface of the glass adjacent to the outlet and then upwardly from the glass.

16. The method of controlling the temperature of molten glass in a spout having a discharge outlet which comprises the steps of flowing the glass through the spout, supplying heat to the glass during its passage through the spout, directing a heating flame downwardly and forwardly to the surface of the glass adjacent to the outlet and then upwardly from the glass, and regulating the temperature effect of the flame independently of the source of said flame.

17. The method of controlling the temperature of molten glass in a spout connected to a glass melting tank, which comprises supplying a temperature-modifying medium to the spout by directing the medium downwardly and forwardly along the surface of the glass and thence upwardly from the surface thereof.

In testimony whereof, we hereby affix our signatures.

OLIVER M. TUCKER.
WILLIAM A. REEVES.